United States Patent [19]

Hislop

[11] Patent Number: 4,492,960
[45] Date of Patent: Jan. 8, 1985

[54] SWITCHING MIXER

[75] Inventor: Alfred R. Hislop, San Diego, Calif.

[73] Assignee: The United States of America as represented by the Secretary of the Navy, Washington, D.C.

[21] Appl. No.: 340,397

[22] Filed: Jan. 18, 1982

[51] Int. Cl.³ .............................................. G01S 9/00
[52] U.S. Cl. ............................ 343/5 DD; 343/5 TM;
333/109; 455/118; 455/323
[58] Field of Search ............ 343/5 TM, 5 DD, 5 PD;
455/78, 86, 81, 325, 326, 327, 330, 331, 332,
323, 118; 333/117, 120, 121, 124, 109

[56] References Cited

U.S. PATENT DOCUMENTS

| 2,507,915 | 5/1950 | Lindenblad | 333/117 X |
| 2,576,979 | 12/1951 | Thompson | 455/81 X |
| 3,622,884 | 11/1971 | Kent | 455/81 |
| 4,288,763 | 9/1981 | Hopfer | 333/117 X |
| 4,333,076 | 6/1982 | Cachier | 343/5 PD X |

FOREIGN PATENT DOCUMENTS 0028894  3/1977  Japan ................ 343/5 TM

OTHER PUBLICATIONS

Yen, Huan-Chun et al., A 63-W W-Band Injection-Locked Pulsed Solid-State Transmitter, 12/81, p. 1294, FIG. 3.
Blore, W. E. et al., 35 and 70 Gc Phase-Locked CW Balanced-Bridge Model Measurement Radars, 9/64, p. 61, FIG. 1.

Primary Examiner—Maynard R. Wilbur
Assistant Examiner—Brian Steinberger
Attorney, Agent, or Firm—Robert F. Beers; Ervin F. Johnston; Harvey Fendelman

[57] ABSTRACT

An RF system is disclosed in which the input mixer of the system is also used as a switch to allow the local oscillator to be used as the transmitter oscillator. The switching mixer may also be used as an attenuator or signal modulator. A local oscillator is connected via a filter to a 90° 3 db hybrid coupler. Two of the four ports of the hybrid coupler are coupled through impedance matching networks to reversely polarized mixer diodes. Bias circuits are connected to the mixer diodes for variably adjusting the bias current to the mixer diodes to thereby adjust their reflection/absorption characteristics. A second filter is connected between the first filter and the hybrid coupler for extracting an intermediate frequency signal. A third filter is connected to the fourth port of the hybrid coupler and to the antenna of the RF system. The first and third filters pass RF and local oscillator signals and block IF signals.

6 Claims, 1 Drawing Figure

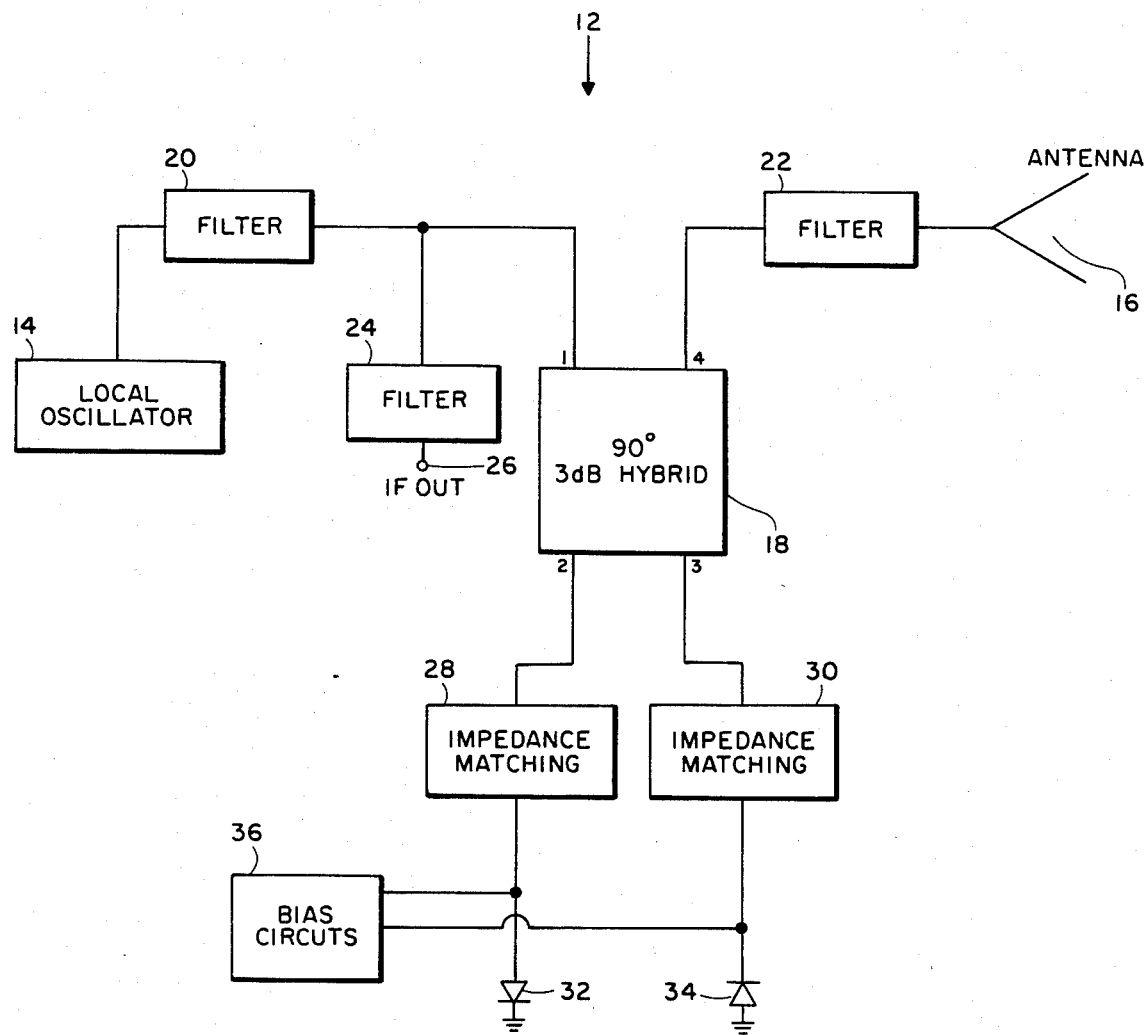

SWITCHING MIXER

BACKGROUND OF THE INVENTION

The present invention relates generally to the field of RF transmitting and receiving systems and more particularly to radio frequency transceiver systems which utilize the same antenna for both transmission and reception.

A typical radio frequency transceiver system using the same antenna both to transmit and receive normally requires an RF switch such as a duplexer or circulator to connect the antenna to either the transmitter or the receiver portions of the system. A mixer is often the first component in the receiver section and a local oscillator signal is mixed with the received RF signal to produce an intermediate frequency (IF) signal. When transmitting, another oscillator is turned on and modulated while connected to the antenna through the RF switch or circulator. Generally, utilization of the duplexer switch or circulator and a second oscillator in the RF system increases the network complexity as well as the overall system cost.

SUMMARY OF THE INVENTION

The present invention permits the use of one oscillator as both the local oscillator and transmitter in low power RF systems and eliminates the requirement for a separate duplexing switch or circulator to connect to the antenna for switching between transmission and reception functions. Also, the switching mixer technique of the present invention can be used as a variable attenuator or modulator.

The switching mixer of the present invention thus allows the mixer to perform multiple functions in low power radio frequency systems. As a mixer, the invention mixes an incoming RF signal with a local oscillator signal to produce an intermediate frequency signal. As a switch, the invention allows power from the local oscillator port to be transferred to the RF port with low loss. These functions are accomplished by appropriately applying bias current to a pair of reversely connected mixer diodes to thereby alter their energy reflection/absorption characteristics. Further, by applying appropriate bias signals, the technique of the present invention can be used to modulate the local oscillator power to produce information carrying sidebands.

OBJECTS OF THE INVENTION

Accordingly, it is the primary object of the present invention to disclose a radio frequency transceiver system in which the mixer of the system is utilized to perform a switching function.

Another object of the present invention is to disclose a radio frequency transceiver system having no duplexer or circulator.

Another object of the present invention is to disclose a radio frequency transceiver system in which the mixer may be utilized to modulate the local oscillator signal to produce information carrying sidebands.

These and other objects of the invention will become more readily apparent from the ensuing specification when taken together with the drawings.

BRIEF DESCRIPTION OF THE DRAWINGS

The sole drawing is a network schematic block diagram of the switching mixer of the present invention.

DESCRIPTION OF THE PREFERRED EMBODIMENT

Referring now to the drawing, there is illustrated a network diagram of the switching mixer of the present invention. The switching mixer of the present invention forms a transceiver system 12 including a local oscillator 14 and an antenna 16. The switching mixer of the present invention is further comprised of a 90° 3 db hybrid coupler 18 illustrated as being a four port device. A first filter 20 is coupled between the local oscillator 14 and port 1 of the hybrid coupler 18. A second filter 22 is coupled between port 4 of the hybrid coupler 18 and the antenna 16. Further, a third filter 24 is coupled between the filter 20 and port 1 of the hybrid coupler 18 and has an intermediate frequency output terminal 26. Filters 20 and 22 pass radio frequency and local oscillator signals and block intermediate frequency signals. Filter 24 blocks radio frequency signals and passes intermediate frequency signals. Impedance matching networks 28 and 30 are connected to ports 2 and 3, respectively, of the hybrid coupler 18. Impedance matching networks may be implemented as printed circuit transformers and are used to match the impedance of the rest of the network to the mixer diodes 32 and 34. The mixer diodes 32 and 34 are connected to the impedance matching networks 28 and 30, respectively, in reverse polarity as illustrated. Finally, a bias network 36 is coupled to the mixer diodes 32 and 34 as illustrated and may be implemented as a selectively variable current source for selectively varying the forward and reverse bias to the diodes 32 and 34.

The switching mixer of the present invention can be implemented in many transmission line media including but not limited to stripline, microstrip, waveguide, coaxial lines or suspended substrate. It should thus be readily apparent that the filter 20, filter 22, filter 24, 3 db hybrid coupler 18 and the impedance matching networks 28 and 30 may be all implemented on a printed circuit card utilizing conventional photolithographic techniques. Also, when embodied in the suspended substrate medium, the filter functions of filters 20 and 22 may be implemented in a suspended substrate to waveguide transition by utilization of a waveguide of appropriate dimensions such that it will not support intermediate frequency signals.

The present invention operates as follows. When operating as a mixer in the receive mode, local oscillator 14 power enters at port 1 of the hybrid coupler 18 and radio frequency power enters at port 4 of the hybrid 18 via filter 22 and antenna 16. In this mode, the 90° hybrid 18, the diodes 32 and 34 and their bias circuits 36 operate with the local oscillator 14 as a balanced mixer. The local oscillator signal and the radio frequency signals enter the 3 db hybrid coupler 18 through ports 1 and 4, respectively, and are split equally between ports 2 and 3 of the coupler 18. They are then passed through the impedance matching networks 28 and 30. The 90° phase shift introduced by the hybrid coupler 18 to the signals entering the hybrid coupler from ports 1 and 4 is such that when the signals are applied to the two mixer diodes 32 and 34, the intermediate frequency output of the mixer diodes are in phase and will add. The intermediate frequency output signals from the mixer diodes 32 and 34 are generated by applying appropriate bias to the diodes through the bias circuits 36 to obtain good conversion loss and impedance match. Generally, in this mode the mixer diodes 32 and 34 absorb the energy in the signals propagated to them, thereby converting these signals to intermediate frequency signals as is well known. The intermediate frequency signals generated by the mixer diodes 32 and 34 are blocked by filters 20 and 22 and are passed by filter 24 to output terminal 26. Since at the intermediate frequency, the 90° hybrid coupler 18 represents a relatively small length of line and appears as a small parasitic reactance to the intermediate frequency signals, the 90° hybrid coupler 18 appears virtually transparent to the intermediate frequency signals. The 90° hybrid coupler 18 thus is not functional as a 90° coupler at intermediate frequencies and acts as an in-phase summing junction for the IF signals from diodes 32 and 34.

When operating in the transmit mode, the impedance of the diodes 32 and 34 is changed as a function of the applied d.c. bias from bias circuits 36. In this mode, the diodes 32 and 34 are biased to provide a large impedance mismatch, thus reflecting power coming from the hybrid 18. The phase of the reflected signals from the diodes 32 and 34 is such that the power from the local oscillator 14 entering the hybrid 18 at port 1 is routed to port 4 of hybrid 18 and thus to the antenna 16 via filter 22.

As the bias changes the impedance of the diodes 32 and 34 from a matched to a mismatched state and varying conditions in between, the amount of power transferred from the local oscillator 14 to the antenna 16 changes and the network of the present invention can be used as a variable attenuator or modulator. This may be accomplished by varying the bias to the diodes 32 and 34 in accordance with the modulation frequency to thereby create an amplitude modulation scheme.

The switching mixer of the present invention can be used in simplex or duplex radar and communications transceiver systems by shifting the frequency of the oscillator 14 by the required intermediate frequency offset when in the receive (mixing) mode.

Obviously, many modifications and variations of the present invention are possible in the light of the above teachings. It is therefore to be understood that within the scope of the appended claims the invention may be practiced otherwise than as specifically described.

What is claimed is:

1. A switching mixer comprising:

a local oscillator having an input and an output;

first filter means connected to said local oscillator output for passing RF signals and signals from said local oscillator and for blocking intermediate frequency signals and having an input and an output;

a hybrid coupler having a first port connected to said output of said first filter means and also having second, third and fourth ports;

first and second impedance matching networks each having a first terminal connected respectively to said hybrid coupler second and third ports and each said impedance matching network having a second terminal;

first and second mixer diodes, each being connected to a respective second terminal of one of said first and second impedance matching networks;

diode bias network means connected to said first and second mixer diodes for variably adjusting the amount of bias to said first and second mixer diodes;

second filter means connected to said hybrid coupler for passing intermediate frequency signals; and third filter means connected to said hybrid coupler fourth port for passing RF signals and signals from said local oscillator and for blocking intermediate frequency signals.

2. The switching mixer of claim 1 comprising:

an antenna connected to said third filter means.

3. The switching mixer of claims 1 or 2 wherein:

said hybrid coupler comprises a 3 db 90° hybrid coupler.

4. The switching mixer of claim 3 wherein:

said second filter means has one end coupled between said first filter means and said hybrid coupler.

5. The switching mixer of claim 3 wherein:

each of said first and second mixer diodes has an anode and a cathode, the anode of said first mixer diode beng connected to said first impedance matching network and the cathode of said second mixer diode being connected to said second impedance matching network.

6. The switching mixer of claim 5 wherein:

said first and second filter means are connected to said first port.

* * * * *